(12) United States Patent
Chi (10) Patent No.: US 11,614,515 B2
(45) Date of Patent: Mar. 28, 2023

(54) OBJECT RECOGNITION METHOD USING RADAR, OBJECT RECOGNITION SYSTEM, AND METHOD OF UPDATING PRIMARY CLASSIFIER IN OBJECT RECOGNITION SYSTEM

(71) Applicant: RichWave Technology Corp., Taipei (TW)

(72) Inventor: Hsiang-Feng Chi, Taipei (TW)

(73) Assignee: RichWave Technology Corp., Taipei (TW)

( * ) Notice: Subject to any disclaimer, the term of this patent is extended or adjusted under 35 U.S.C. 154(b) by 284 days.

(21) Appl. No.: 17/015,023

(22) Filed: Sep. 8, 2020

(65) Prior Publication Data

US 2021/0103026 A1    Apr. 8, 2021

(30) Foreign Application Priority Data

Oct. 2, 2019    (TW) .................. 108135703

(51) Int. Cl.
  *G01S 7/40*    (2006.01)
  *G01S 7/41*    (2006.01)
  (Continued)

(52) U.S. Cl.
  CPC .............. *G01S 7/40* (2013.01); *G01S 7/4021* (2013.01); *G01S 7/415* (2013.01); *G01S 7/417* (2013.01);
  (Continued)

(58) Field of Classification Search
  CPC .......... G01S 7/40; G01S 7/4021; G01S 7/415; G01S 7/417; G01S 13/86; G01S 13/867; G06K 9/00536
  See application file for complete search history.

(56) References Cited

U.S. PATENT DOCUMENTS

| 4,025,920 A | 5/1977 | Reitboeck |
| 7,450,052 B2 | 11/2008 | Hausner |

(Continued)

FOREIGN PATENT DOCUMENTS

| CN | 103576154 A | 2/2014 |
| TW | I614515 B | 2/2018 |
| TW | 201835603 A | 10/2018 |

OTHER PUBLICATIONS

Andrić, Milenko, et al. "Analysis of radar Doppler signature from human data." Radioengineering 23.1 (2014): 11-19 (Year: 2014).*

(Continued)

*Primary Examiner* — Peter M Bythrow
*Assistant Examiner* — Nazra Nur Waheed
(74) *Attorney, Agent, or Firm* — Winston Hsu (57) ABSTRACT

An object recognition method includes generating a first frequency domain signal according to a first echo signal, updating at least one parameter of a primary classifier according to the first frequency domain signal and a training target corresponding to the first frequency domain signal, generating a second frequency domain signal according to a second echo signal, and generating object classification data corresponding to the second frequency domain signal according to the second frequency domain signal and the at least one parameter of the primary classifier. The object classification data is associated with presence of a second object.

19 Claims, 5 Drawing Sheets

(51) Int. Cl.
    *G01S 13/86*     (2006.01)
    *G06K 9/00*     (2022.01)

(52) U.S. Cl.
    CPC ............ *G01S 13/86* (2013.01); *G01S 13/867* (2013.01); *G06K 9/00536* (2013.01)

(56) References Cited

U.S. PATENT DOCUMENTS

| | | | | |
|---|---|---|---|---|
| 2018/0120420 A1* | 5/2018 | McMahon | .............. | G01S 13/62 |
| 2019/0279366 A1* | 9/2019 | Sick | ..................... | G06K 9/6256 |

OTHER PUBLICATIONS

Michael Otero, Application of a continuous wave radar for human gait recognition, Proc. of SPIE vol. 5809, May 2005, pp. 538-548, XP002384571.

Milenko Andrić et al., Analysis of Radar Doppler Signature from Human Data, Radioengineering, vol. 23, No. 1, Apr. 2014, pp. 11-19, XP055772932.

* cited by examiner

OBJECT RECOGNITION METHOD USING RADAR, OBJECT RECOGNITION SYSTEM, AND METHOD OF UPDATING PRIMARY CLASSIFIER IN OBJECT RECOGNITION SYSTEM

CROSS REFERENCE TO RELATED APPLICATION

This non-provisional application claims priority of Taiwan patent application No. 108135703, filed on 2 Oct. 2019, included herein by reference in its entirety.

TECHNICAL FIELD

The invention relates to object recognition, and specifically, to an object recognition method using radar, an object recognition system, and a method of updating a primary classifier in an object recognition system.

BACKGROUND

Object recognition is used to identify or classify various moving or stationary target objects such as people, animals, and vehicles in a variety of environments, and is widely used in the fields of autonomous driving, smart home, and robot applications. Related art generally employs image recognition to identify objects. However, clear images are essential for image recognition to ensure the accuracy of recognition. Consequently, the image recognition is unreliable in dark, low-light or complicated light environments. The use of radar can eliminate the interference of light. The radar can be used to detect objects regardless of day or night, in dense woods or tunnel exits where the light changes abruptly. Nevertheless, the accuracy of employing radar to recognize object remains low.

Therefore, it is desired to develop an object recognition method and an object recognition system to recognize objects using radar, delivering accurate object recognition results without being affected by the light.

SUMMARY

According to one embodiment, an object recognition method includes generating a first frequency domain signal according to a first echo signal, updating at least one parameter of a primary classifier according to the first frequency domain signal and a training target corresponding to the first frequency domain signal, generating a second frequency domain signal according to a second echo signal, and generating object classification data corresponding to the second frequency domain signal according to the second frequency domain signal and the at least one parameter of the primary classifier. The object classification data is associated with presence of a second object.

According to another embodiment, an object identification system includes an antenna and a controller. The antenna is used to transmit a first detection signal and receive a first echo signal upon detecting a first object. The controller is coupled to the antenna and is used to generate a frequency domain signal according to the first echo signal, and update at least one parameter of a primary classifier according to the first frequency domain signal and a training target corresponding to the first frequency domain signal. The antenna is further used to transmit a second detection signal and receive a second echo signal upon detecting a second object. The controller is further used to generate a second frequency domain signal according to the second echo signal, and generate object classification data corresponding to the second frequency domain signal according to the second frequency domain signal and the at least one parameter of the primary classifier. The object classification data is associated with presence of a second object.

According to another embodiment, a primary classifier in an object recognition system is used to recognize an object, and a method of updating the primary classifier includes: receiving a first echo signal during a first interval; generating a first frequency domain signal according to the first echo signal; receiving an auxiliary signal during a second interval, wherein the first interval and the second interval are at least partially overlapping in an at least partially overlapping interval; generating a training target corresponding to the first frequency domain signal according to the auxiliary signal; and updating at least one parameter of the primary classifier according to the first frequency domain signal and the training target corresponding to the first frequency domain signal. The first echo signal is associated with presence of a first object, the auxiliary signal is associated with the presence of the first object, and the presence of the first object occurs during the at least partially overlapping interval.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 1:
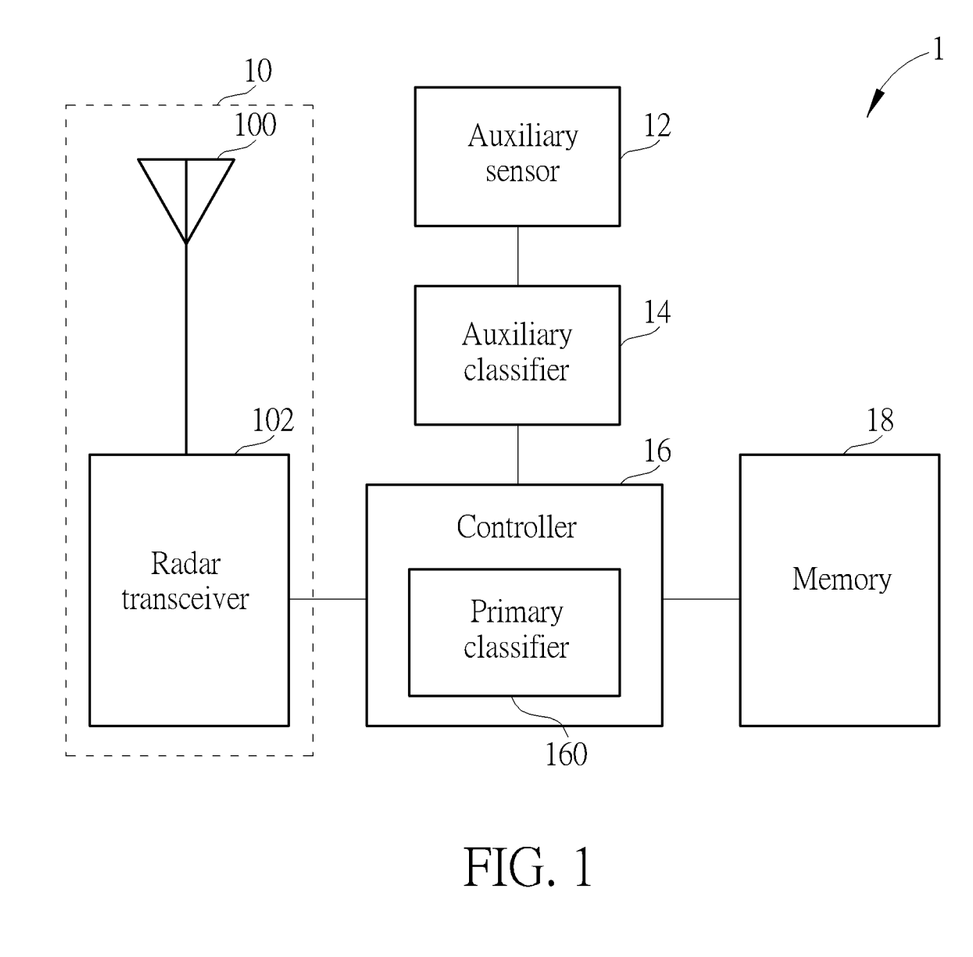
FIG. 1 is a block diagram of an object recognition system according to an embodiment of the invention.

FIG. 1 is a block diagram of an object recognition system 1 according to an embodiment of the invention. The object recognition system 1 may utilize a radar echo signal to recognize a variety of movements of an object, such as a movement of a person, a movement of a dog or a cat, or a movement of a non-living object such as an electric fan. Since various parts of an object move at various velocities and/or various frequencies as the object performs a particular movement, e.g., a person moves his arms and legs at different velocities and frequencies when walking and running, a pet moves its forearms and hind legs at irregular frequencies when moving, a fan rotates at a fixed frequency. Those velocities and/or frequencies may be shown in the radar echo signals to serve as features for recognizing or classifying a particular object and/or a particular motion thereof. In practice, the object recognition system 1 may train a classifier in real time according to an echo signal and a training target, using a large quantity of real and representative data sets to reduce a generalization error. The training target may include an object type and/or a motion type. The object type may be a person, a cat, a dog, a fan and others, and the motion types may be moving forwards, moving backwards, standing still, rotating at a fixed frequency and others. Later, the object recognition system 1 may recognize or classify an object type and/or a motion type according to echo signals detected by the classifier being trained or completed training.

The object recognition system 1 includes radar equipment 10, an auxiliary sensor 12, an auxiliary classifier 14, a controller 16 and a memory 18. The radar equipment 10 includes an antenna 100 and a radar transceiver 102. The controller 16 includes a primary classifier 160. The antenna 100 is coupled to the radar transceiver 102. The auxiliary sensor 12 is coupled to the auxiliary classifier 14. The controller 16 is coupled to the radar transceiver 102, the auxiliary classifier 14 and the memory 18.

The radar equipment 10 may be a continuous wave radar, a frequency modulated continuous wave radar, a pulse radar or another type of radar. The antenna 100 may transmit a detection signal and receive a corresponding echo signal upon detecting an object. The radar transceiver 102 may generate a Doppler signal having a Doppler frequency shift according to the echo signal. The detection signal may be a monotone, chirps or periodic pulses. The echo signal may be a reflection resulting from the detection signal hitting the object. The Doppler signal may be a digital signal or an analog signal. Since a velocity of the object corresponds to the Doppler frequency shift, the controller 16 may perform a frequency domain transform on the Doppler signal to generate a frequency domain signal, and determine the velocity of the object according to the frequency domain signal. The frequency domain signal may serve as a data set to train the primary classifier 160, and may be Doppler spectrogram data representing variations of velocity components with respect to time and containing patterns to recognize a specific object and/or a specific motion thereof.

The auxiliary sensor 12 and the auxiliary classifier 14 may generate a training target in real time. The auxiliary sensor 12 may continuously receive an auxiliary signal, and may be a video camera, a camera or a microphone. The auxiliary signal may be a video data stream or an audio data stream. The auxiliary classifier 14 may be an image-based or sound-based classification system, e.g., a convolution neural network applicable to computer vision and generating a corresponding object and/or a motion as the training target according to an image data stream, so as to train the primary classifier 160. For example, the training target may be a person moving forward or an animal moving. The auxiliary classifier 14 may generate a training target having high accuracy, e.g., the accuracy may be 95%. The auxiliary classifier 14 and the primary classifier 160 may be realized by an artificial neural network such as a multilayer perceptron (MLP) or a convolution neural network, or a classification algorithm such as a support vector machine (SVM). The auxiliary classifier 14 and the primary classifier 160 may be stored in the same or different memories, and loaded onto the same or different controllers, microcontrollers, processors, microprocessors or integrated circuits for execution. In some embodiments, the auxiliary classifier 14 and the primary classifier 160 may be stored in the memory 18 and loaded onto the controller 16 for execution.

Since the pattern of the Doppler spectrogram data may represent a particular movement performed by a particular object, the primary classifier 160 may recognize the object type and/or the motion type of the object to be classified according to the Doppler spectrogram data. The primary classifier 160 may be operated in a training stage or a recognition stage. In the training stage, the antenna 100 may transmit a first detection signal and receive a first echo signal upon detecting a first object, the radar transceiver 102 may generate a first Doppler signal according to the first echo signal, and the controller 16 may generate the first frequency domain signal according to the first Doppler signal. In some embodiments, the controller 16 may perform a time-domain-to-frequency-domain transform on the first Doppler signal to generate the first frequency domain signal. Owing to a movement of the first object, the first echo signal has a first Doppler frequency shift relative to the first detection signal. The first frequency signal may be a first Doppler frequency domain signal, and may carry first Doppler spectrogram data. The first Doppler spectrogram data may be energies of velocities with respect to time, and may include first data corresponding to M first velocities, where M is a positive integer exceeding 1. The auxiliary sensor 12 may receive the auxiliary signal while the antenna 100 receives the first echo signal, and the auxiliary classifier 14 may generate, according to the auxiliary signal, a training target corresponding to the first frequency domain signal. Next, the controller 16 may train the primary classifier 160 by updating at least one parameter of the primary classifier 160 according to the first frequency domain signal and the training target corresponding to the first frequency domain signal. In one embodiment, the controller 16 may transform the first data in the first frequency domain signal and corresponding to M velocities into M sets of first spectrum data, respectively, combine the M sets of first spectrum data to acquire first cadence spectrum data, acquire a first cadence feature from the first cadence spectrum data, and update the at least one parameter of the primary classifier 160 according to the first cadence feature and the training target of the first frequency domain signal. The first cadence spectrum data may include an energy sum over a velocity range corresponding to frequencies in the first Doppler spectrogram data, and include a pattern for use to recognize a specific object, a specific movement and/or a specific movement of the specific object.

In some embodiments, the antenna 100 may receive the first echo signal in a first time interval, the auxiliary sensor 12 may receive the auxiliary signal in a second time interval, and the auxiliary classifier 14 may generate the training target corresponding to the first frequency domain signal according to the auxiliary signal. The first echo signal is associated with presence of the first object, and the auxiliary signal and the training target are associated with the presence of the first object. In a partially overlapping interval, the first time interval and the second time interval are partially overlapping and the presence of the first object occurs in the partially overlapping interval. The controller 16 may determine the presence of the first object according to the first Doppler signal, and the auxiliary classifier 14 may input the training target corresponding to the first frequency domain signal into the controller 16 according to the presence of the first object. The radar equipment 10 may detect the object upon the controller 16 receiving the first Doppler signal, and the primary classifier 160 may initiate the training stage. The controller 16 may notify the auxiliary classifier 14 by a control signal to output the training target, and input the first frequency domain signal generated by the controller 16 and the training target generated by the auxiliary classifier 14 into the primary classifier 160 to perform training, e.g., updating the at least one parameter of the primary classifier 160. In some embodiments, the controller 16 may transmit a trigger signal to the auxiliary classifier 14 to notify the auxiliary classifier 14 to recognize or classify the object type and/or the motion type according the auxiliary signal, and output the object type and/or the motion type to the controller 16 as the training target. In other embodiments, upon receiving the first Doppler signal and stopping receiving the first Doppler signal, the controller 16 may respectively transmit a segmentation initiation signal and a segmentation termination signal to the auxiliary classifier 14 to notify the auxiliary classifier 14 to segment the auxiliary signal to generate an auxiliary signal segment, recognize or classify the object type and/or the motion type according the auxiliary signal segment, and output the object type and/or the motion type to the controller 16 as the training target. The training target is associated with the motion type of the first object, and may be of the object type or the motion type.

In some situations, for example, when the primary classifier 160 completes training or does not operate in the training stage, or the auxiliary sensor 12 or auxiliary classifier 14 is unable/not to be used, the primary classifier 160 may enter the recognition stage, and the controller 16 may employ the primary classifier 160 to recognize or classify the object type and/or the motion type according to the first frequency domain signal. In the recognition stage, the antenna 100 may transmit a second detection signal and receive a second echo signal upon detecting a second object, the radar transceiver 102 may generate a second Doppler signal according to the second echo signal, and the controller 16 may generate the second frequency domain signal according to the second Doppler signal. In some embodiments, the controller 16 may perform a time-domain-to-frequency-domain transform on the second Doppler signal to generate the second frequency domain signal. Owing to a movement of the second object, the second echo signal has a second Doppler frequency shift relative to the second detection signal. The second frequency signal may be the second Doppler frequency domain signal, and may carry second Doppler spectrogram data. The second Doppler spectrogram data may be energies of velocities with respect to time, and may include second data corresponding to M second velocities. The controller 16 may generate the object classification data corresponding to the second frequency domain signal according to the second frequency domain signal and the at least one parameter of the primary classifier 160, e.g., the parameter updated in the previous training stage.

In one embodiment, the controller 16 may transform the second data in the second frequency domain signal and corresponding to M velocities into M sets of second spectrum data, respectively, combine the M sets of second spectrum data to acquire second cadence spectrum data, acquire a second cadence feature from the second cadence spectrum data, and generate the object classification data corresponding to the second frequency domain signal according to the at least one parameter of the primary classifier 160 and the second cadence feature. The second cadence spectrum data may include an energy sum over a velocity range corresponding to frequencies in the second Doppler spectrogram data, and include a pattern for use to recognize a specific object and/or a specific movement thereof. In some embodiments, the controller 16 may further update the at least one parameter of the primary classifier 160 according to the second frequency domain signal and the object classification data. The object classification data is associated with presence of the second object, and the second object may be the same or different from the first object. The object classification data is associated with the motion type of the second object, and may be of the object type or the motion type.

In some embodiments, the first cadence feature and/or the second cadence feature may be movement distances of living objects and/or ratios of the limbs to the torsos. The first object and/or the second object may include primary portions (e.g., torsos) and secondary portions (e.g., limbs) of living objects (e.g., a person or a dog). The controller 16 may identify fundamental frequencies fm and primary velocities V of the primary portions from the first cadence spectrum data and/or the second cadence spectrum data, and generate the movement distances according to the fundamental frequencies fm and primary velocities V. The movement distances may be stride lengths S expressed by Equation 1:

$$S = V/fm \qquad \text{Equation 1}$$

Different animals may have different stride lengths S. For example, the stride lengths S of a human being may be between 30 to 40 cm, and the stride lengths S of a dog may be less than 10 cm. Next, the controller 16 may identify the secondary energies Ss corresponding to the secondary portions and the primary energies Sp corresponding to the primary portions from the first cadence spectrum data and/or the second cadence spectrum data, and generate ratio relationships R of the secondary energies Ss to the primary energies Sp, the ratio relationships R may be expressed by Equation 2:

$$R = \frac{Ss}{Sp} = \frac{\sum_{n=1}^{N} Sn}{S0} \qquad \text{Equation 2}$$

where n is an index of secondary energy components;
N is the maximum index of the secondary energy components;
S0 is the primary energy; and
Sn is a secondary energy component.

Different animals may have different ratio relationships R. For example, the ratio relationship R of a human being may be approximately 0.6, and the ratio relationship R of a dog may be greater than 0.7. The controller 16 may employ movement distance S and the ratio relationship R as the first cadence feature and/or the second cadence feature. In one embodiment, the first cadence feature may include the movement distance S and/or the ratio relationship R according to the first frequency domain signal, and the second cadence feature may include the movement distance S and/or the ratio relationship R according to the second frequency domain signal. The controller 16 may update the at least one parameter of the primary classifier 160 according to the first cadence feature and the training target corresponding to the first frequency domain signal. The controller 16 may generate, according to the second cadence feature, the object classification data corresponding to the second frequency domain signal.

In other embodiments, the first cadence features may be a fundamental frequency and a harmonic frequency of the first cadence spectrum data, and the second cadence features may be a fundamental frequency and a harmonic frequency of the second cadence spectrum data. The controller 16 may identify the fundamental frequency and the harmonic frequency from the first cadence spectrum data to serve as the first cadence features, and/or identify the fundamental frequency and the harmonic frequency from the second cadence spectrum data to serve as the second cadence features. The controller 16 may update the at least one parameter of the primary classifier 160 according to the first cadence feature and the training target corresponding to the first frequency domain signal. The controller 16 may generate, according to the second cadence feature, the object classification data corresponding to the second frequency domain signal.

In other embodiments, the controller 16 may perform an auto-correlation process on the first cadence spectrum data to generate a plurality of auto-correlations, compute the minimum of differences of two adjacent ones of the plurality of auto-correlations, and employ the minimum as the first cadence feature. Similarly, the controller 16 may perform the auto-correlation process on the second cadence spectrum data to generate a plurality of auto-correlations, compute the minimum of differences of two adjacent ones of the plurality of auto-correlations, and employ the minimum as the second cadence feature. The controller 16 may update the at least one parameter of the primary classifier 160 according to the first cadence feature and the training target corresponding to the first frequency domain signal. The controller 16 may generate, according to the second cadence feature, the object classification data corresponding to the second frequency domain signal.

In some embodiments, the controller 16 may perform a velocity normalization process on the first spectrogram data according to the maximum velocity of the first spectrogram data to generate first velocity-normalized spectrogram data, and transform first data of the first velocity-normalized spectrogram data corresponding to the M first velocities into M sets of first spectrum data. Similarly, the controller 16 may perform the velocity normalization process on the second spectrogram data according to the maximum velocity of the second spectrogram data to generate second velocity-normalized spectrogram data, and transform second data of the second velocity-normalized spectrogram data corresponding to the M second velocities into M sets of first spectrum data. In other embodiments, the controller 16 may generate first combined spectrogram data according to the positive velocities and negative velocities of the first spectrogram data, and convert first data in the first combined spectrogram data corresponding to M first velocities into M sets of first spectrum data. Likewise, the controller 16 may generate second combined spectrogram data according to the positive velocities and negative velocities of the second spectrogram data, and convert second data in the second combined spectrogram data corresponding to M second velocities into M sets of second spectrum data. In one embodiment, the controller 16 may compute an energy sum of all the positive velocities and an energy sum of all the negative velocities of the first spectrogram data, determine which of the energy sums is larger, divide energies of the velocities having the larger energy sum to energies of corresponding velocities having the smaller energy sum to generate the first combined spectrum data. Similarly, the controller 16 may compute an energy sum of all the positive velocities and an energy sum of all the negative velocities of the second spectrogram data, determine which of the energy sums is larger, divide energies of the velocities having the larger energy sum to energies of corresponding velocities having the smaller energy sum, respectively, to generate the second combined spectrum data. In another embodiment, the controller 16 may compute an energy sum of all the positive velocities and an energy sum of all the negative velocities of the first spectrogram data, determine which of the energy sums is larger, and generate the first combined spectrum data according to the velocities having the larger energy sum. Similarly, the controller 16 may compute an energy sum of all the positive velocities and an energy sum of all the negative velocities of the second spectrogram data, determine which of the energy sums is larger, and generate the second combined spectrum data according to the velocities having the larger energy sum.

Then, the controller 16 may combine the M sets of first spectrum data or the first combined spectrum data to obtain the first cadence spectrum data, and acquire the first cadence feature from the first cadence spectrum data. Likewise, the controller 16 may combine the M sets of second spectrum data or the second combined spectrum data to obtain the second cadence spectrum data, and acquire the second cadence feature from the second cadence spectrum data. The controller 16 may update the at least one parameter of the primary classifier 160 according to the first cadence feature and the training target corresponding to the first frequency domain signal. The controller 16 may generate the object classification data corresponding to the second frequency domain signal according to the at least one parameter of the primary classifier 160 and the second cadence feature.

The object recognition system 1 may employ the radar equipment 10 and the primary classifier 160 to recognize the object type and/or the motion type without or hardly being affected by the ambient light while providing more accurate object recognition results.

Figure 2:
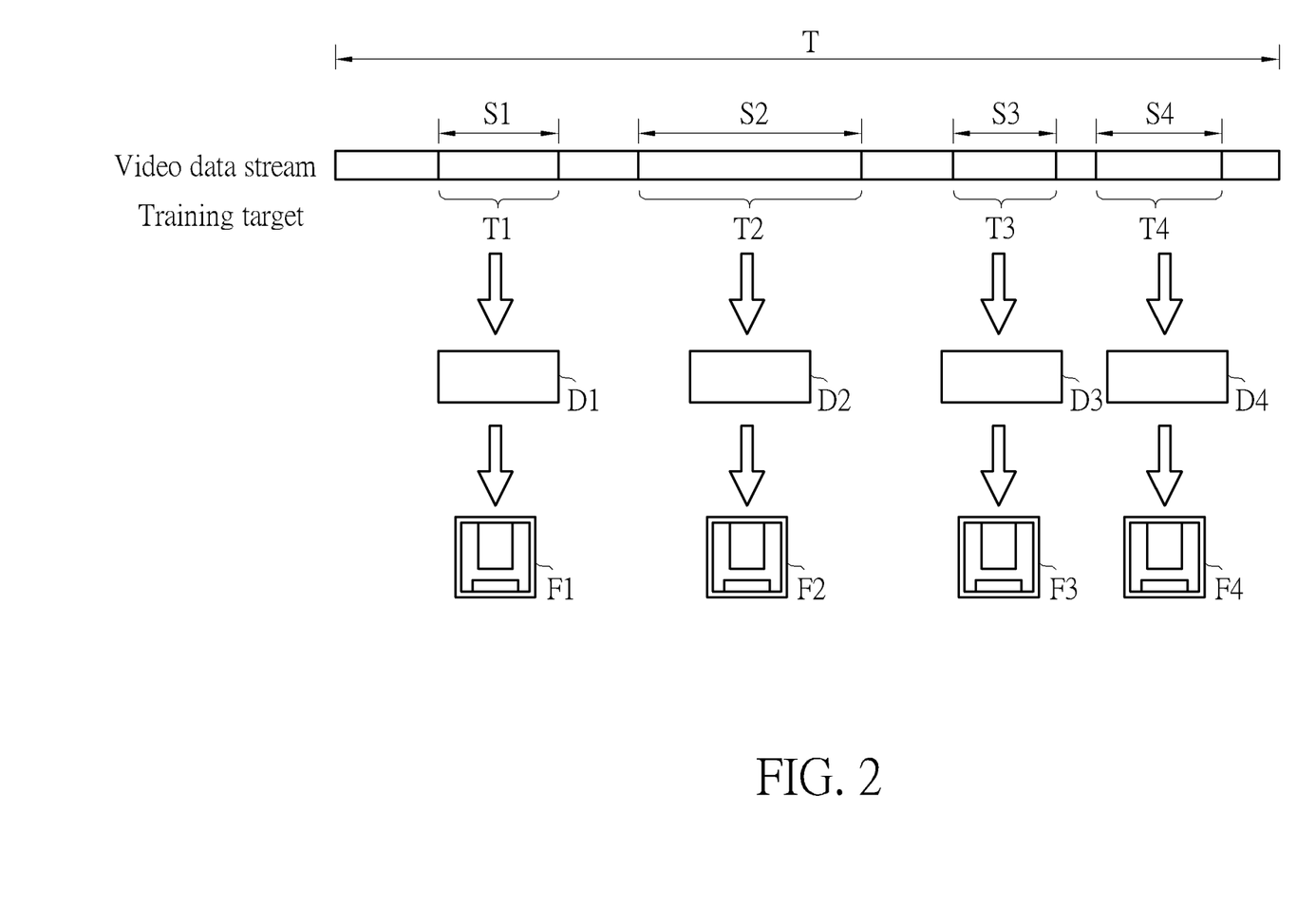
FIG. 2 is a schematic diagram of a method of generating training data and training targets and adopted by the object recognition system in FIG. 1.

FIG. 2 is a schematic diagram of a method of generating training data sets and training targets and adopted by the object recognition system 1. In the embodiment, the radar equipment 10 may be a continuous wave radar, the auxiliary sensor 12 may be a video camera, and the auxiliary classifier 14 may be a convolution neural network configured to classify objects according to images. In a time interval T, the auxiliary sensor 12 may receive and record a video data stream in real time, while the radar equipment 10 may continuously detect an object. Upon the radar equipment 10 detecting an object for the first time, the controller 16 may notify the auxiliary classifier 14 to segment the video data stream to generate a video data segment S1 and generate a training target T1 (e.g., a person moving forward) according to the video data segment S1, the controller 16 may generate a data set D1 (e.g., Doppler spectrogram data corresponding to the person moving forward), and then the controller 16 may store the training target T1 and the data set D1 as a training file F1 for use by the primary classifier 160 in subsequence training, or directly output the training target T1 and the data set D1 to the primary classifier 160 to perform real-time training. Upon the radar equipment 10 detecting an object for the second time, the controller 16 may notify the auxiliary classifier 14 to segment the video data stream to generate a video data segment S2 and generate a training target T2 (e.g., a person standing still) according to the video data segment S2, the controller 16 may generate a data set D2 (e.g., Doppler spectrogram data corresponding to the person standing still), and then the controller 16 may store the training target T2 and the data set D2 as a training file F2 for use by the primary classifier 160 in subsequence training, or directly output the training target T2 and the data set D2 to the primary classifier 160 to perform real-time training. Upon the radar equipment 10 detecting an object for the third time, the controller 16 may notify the auxiliary classifier 14 to segment the video data stream to generate a video data segment S3 and generate a training target T3 (e.g., a pet moving) according to the video data segment S3, the controller 16 may generate a data set D3 (e.g., Doppler spectrogram data corresponding to the pet moving), and then the controller 16 may store the training target T3 and the data set D3 as a training file F3 for use by the primary classifier 160 in subsequence training, or directly output the training target T3 and the data set D3 to the primary classifier 160 to perform real-time training. Upon the radar equipment 10 detecting an object for the fourth time, the controller 16 may notify the auxiliary classifier 14 to segment the video data stream to generate a video data segment S4 and generate a training target T4 (e.g., a person moving backward) according to the video data segment S4, the controller 16 may generate a data set D4 (e.g., Doppler spectrogram data corresponding to the person moving backward), and then the controller 16 may store the training target T4 and the data set D4 as a training file F4 for use by the primary classifier 160 in subsequence training, or directly output the training target T4 and the data set D4 to the primary classifier 160 to perform real-time training. In another embodiment, upon the auxiliary classifier 14 detecting objects, the controller 16 may notify the auxiliary classifier 14 to segment the video data stream to generate the video data segments S1 to S4. In one embodiment, the length of the video data segments S1 to S4 may be determined by one or a combination of the following: a fixed value, a time interval in which the radar equipment 10 detects the presence of the object, and a time interval in which the auxiliary classifier 14 detects the presence of the object.

Figure 3:
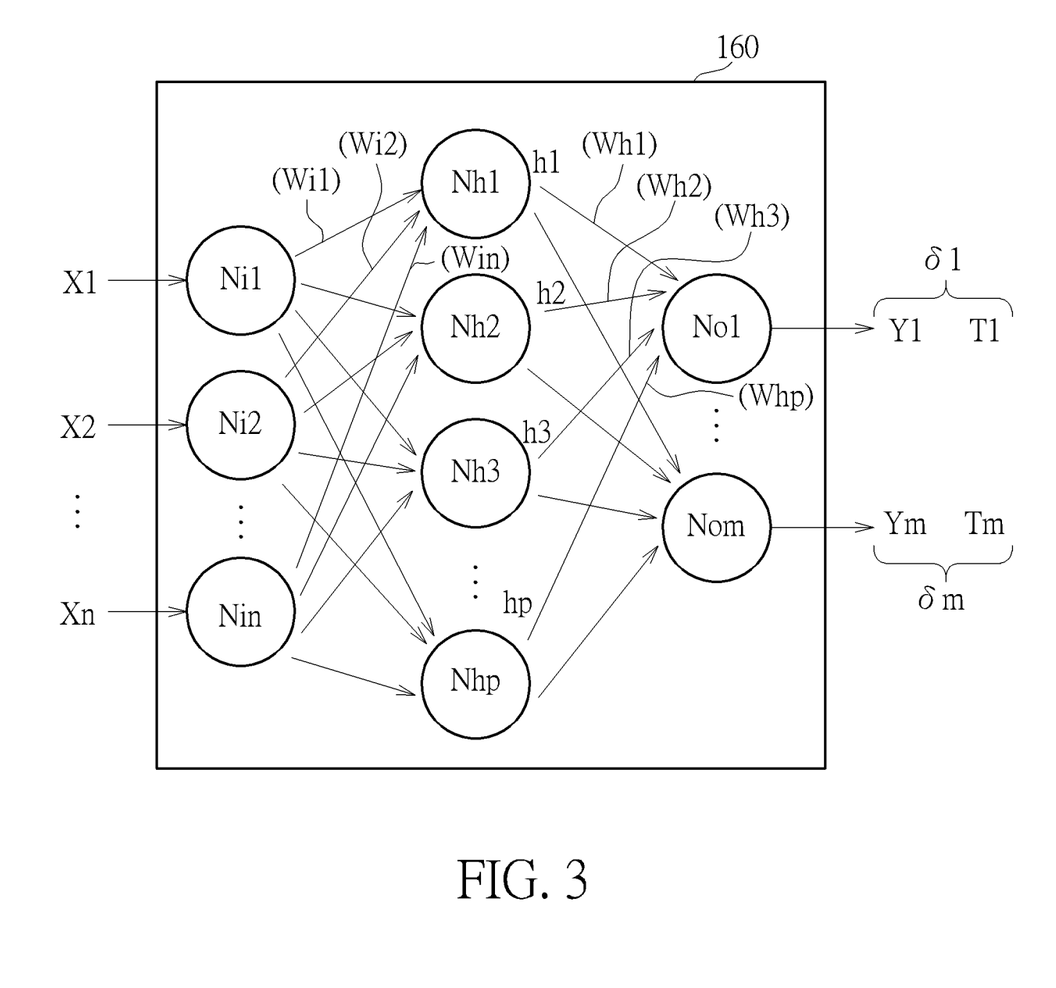
FIG. 3 is a schematic diagram of the primary classifier in FIG. 1.

FIG. 3 is a schematic diagram of the primary classifier 160 adopting a multilayer perceptron. The primary classifier 160 includes an input layer, a hidden layer and an output layer. In some embodiments, multiple hidden layers may be applied. The output layer includes input nodes Ni1 to Nin, the hidden layer includes hidden node Nh1 to Nhp, and the output layer includes output nodes No1 to Nom, wherein n, p and m are positive integers. The input nodes Ni1 to Nin may receive a training data set including inputs X1 to Xn, respectively. The hidden node Nh1 to Nhp may receive linear weighted sums of the input X1 to Xn via n connection parameters and generate hidden node outputs h1 to hp via activation functions, respectively. For example, the hidden node Nh1 may receive a linear weighted sum (X1*wi1+ X2*wi2+ . . . +Xn*win) and generate a hidden node output h1 via an activation function tan h. The output nodes No1 to Nom may receive a linear weighted sum of all hidden node outputs via p connection parameters and generate estimated outputs Y1 to Ym via activation functions, respectively. For example, the output node No1 may receive the linear weighted sum (h1*wh1+h2*wh2+h3*wh3+ . . . +hp*whp) and generate the estimated output Y1 via the activation function tan h. The controller 16 may adjust or update the at least one parameter in the primary classifier 160 to reduce errors δ1 to δm between the estimated outputs Y1 to Ym and corresponding training targets T1 to Tm, respectively. The inputs X1 to Xn may be the training data set generated by the controller 16, the training target T1 to Tm may be the object type and/or the motion type generated by the auxiliary classifier 14. When using the Doppler spectrogram data as the training data set for training the primary classifier 160, the inputs X1 to Xn may be n velocity components at n points in time. When using the first cadence spectrum data as the training data set for training the primary classifier 160, the inputs X1 to Xn may be n sums over energies of velocities at n points in time. In one embodiment, the inputs X1 to Xn may be the aforementioned first cadence features.

While the embodiment in FIG. 3 adopts the multilayer perceptron as the primary classifier 160, other types of artificial neural networks or other classification algorithms may also be adopted.

Figure 4:
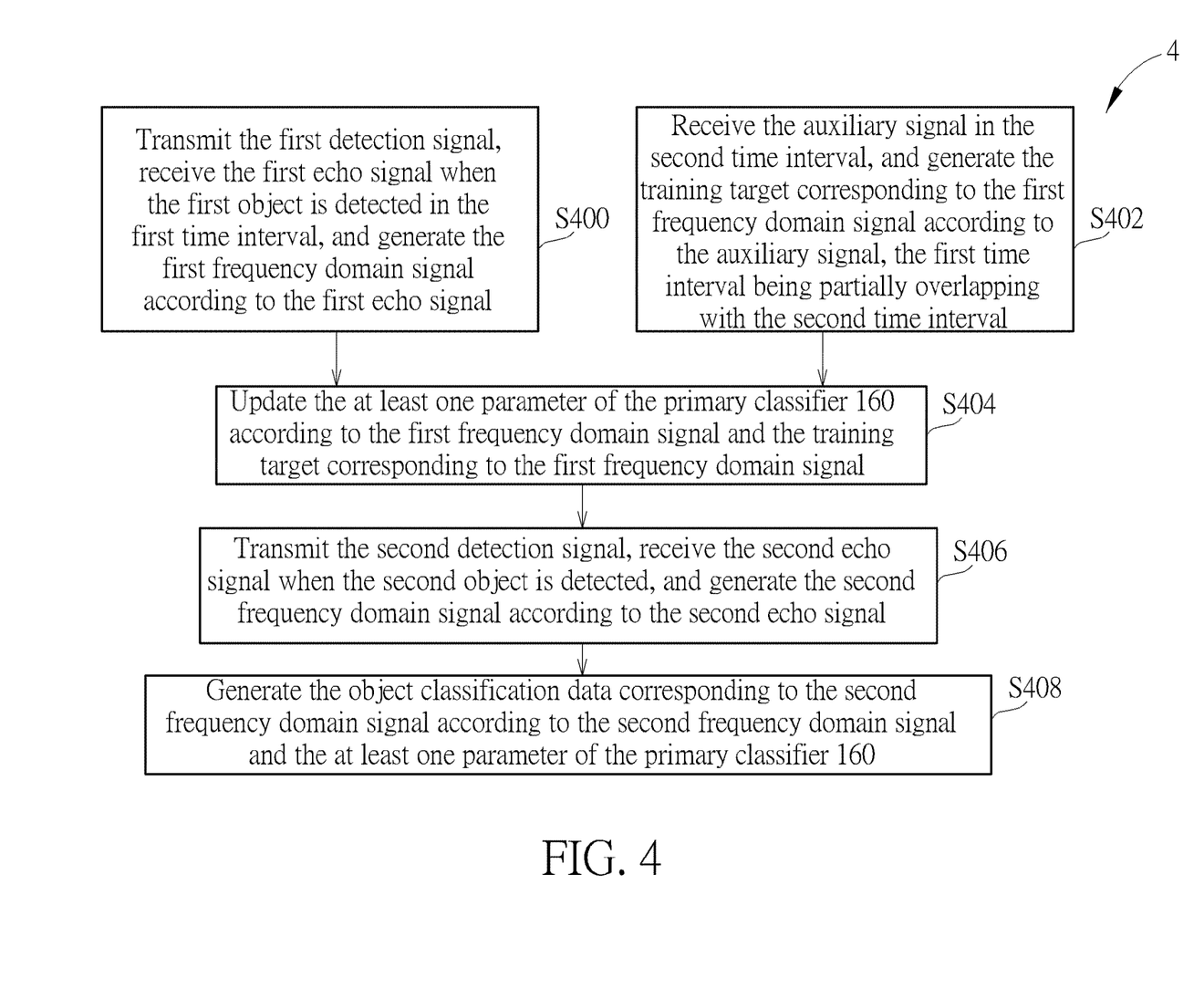
FIG. 4 is a flowchart of an object recognition method according to an embodiment of the invention.

FIG. 4 is a flowchart of an object recognition method 4 according to an embodiment of the invention. The object recognition method 4 is applicable to the object recognition system 1, and includes Steps S400 to S408. Steps S400 to S406 are used to train the primary classifier 160, and Step S408 is used to recognize the object type and/or the motion type. Any reasonable technological change or step adjustment is within the scope of the disclosure. Steps S400 to S408 are detailed as below:

Step S400: Transmit the first detection signal, receive the first echo signal when the first object is detected in the first time interval, and generate the first frequency domain signal according to the first echo signal; proceed to Step S404;

Step S402: Receive the auxiliary signal in the second time interval, and generate the training target corresponding to the first frequency domain signal according to the auxiliary signal, the first time interval being partially overlapping with the second time interval;

Step S404: Update the at least one parameter of the primary classifier 160 according to the first frequency domain signal and the training target corresponding to the first frequency domain signal;

Step S406: Transmit the second detection signal, receive the second echo signal when the second object is detected, and generate the second frequency domain signal according to the second echo signal;

Step S408: Generate the object classification data corresponding to the second frequency domain signal according to the second frequency domain signal and the at least one parameter of the primary classifier 160.

Steps S400 to S408 are explained in the preceding paragraphs, the details thereof are not repeated here. Steps S400 to S408 can be used to train the primary classifier 160 to identify objects, and after the training is completed, the radar equipment 10 can be used to directly identify the object type and/or the motion type without being affected by ambient light.

Figure 5:
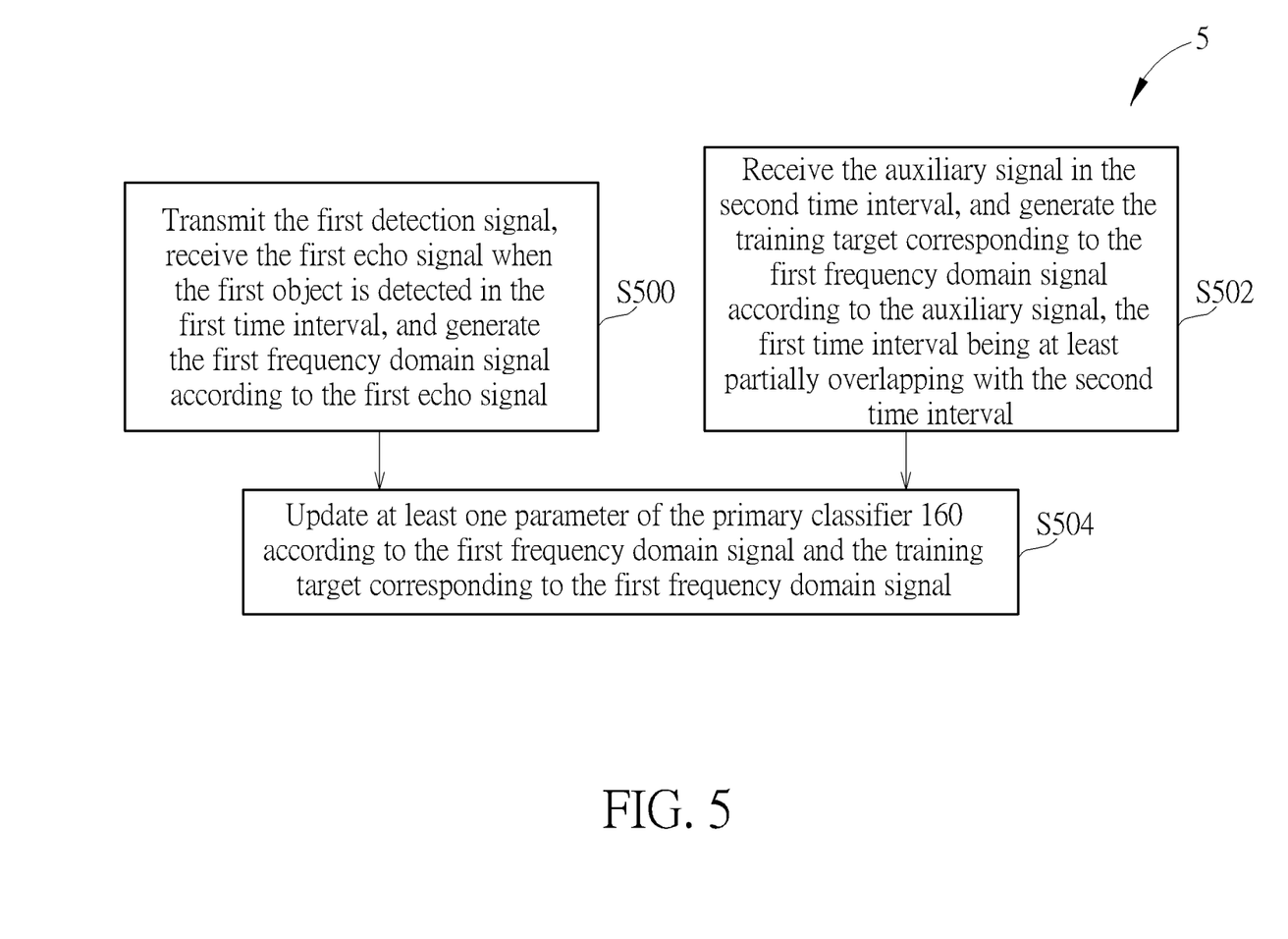
FIG. 5 is a flowchart of a method of updating the primary classifier of the object recognition system in FIG. 1.

FIG. 5 is a flowchart of a method 5 of updating the primary classifier of the object recognition system 1. The method 5 is applicable to the object recognition system 1, and includes Steps S500 to S504 for use to train the primary classifier 160. Any reasonable technological change or step adjustment is within the scope of the disclosure. Steps S500 to S504 are detailed as below:

Step S500: Transmit the first detection signal, receive the first echo signal when the first object is detected in the first time interval, and generate the first frequency domain signal according to the first echo signal; proceed to Step S504;

Step S502: Receive the auxiliary signal in the second time interval, and generate the training target corresponding to the first frequency domain signal according to the auxiliary signal, the first time interval being at least partially overlapping with the second time interval;

Step S504 Update at least one parameter of the primary classifier 160 according to the first frequency domain signal and the training target corresponding to the first frequency domain signal.

In above Steps, the first echo signal is associated with presence of the first object, the auxiliary signal is associated with the presence of the first object, and the presence of the first object occurs during the at least partially overlapping interval. Steps S500 to S504 are explained in the preceding paragraphs, the details thereof will not be repeated here.

Where the external environment is appropriate, for example, when the ambient light is sufficient or the ambient noise is low, in Steps S500 to S504, the auxiliary sensor 12 and the auxiliary classifier 14 may generate training targets in real time to train primary classifier 160 to recognize objects, thereby performing supervised learning on the object recognition system 1.

The object recognition method 4 and the object recognition system 1 employ the radar equipment 10 to recognize the object type and/or the motion type without or hardly being affected by the ambient light while providing more accurate object recognition results. The object recognition system 1 and the method 5 of updating the primary classifier 160 in the object recognition system may generate training targets in real time to provide supervised learning to the object recognition system 1, enhancing a success rate of recognizing an object.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object recognition method for use in a radar, the method comprising:
   an antenna receiving a first echo signal and a second echo signal;
   a controller generating a first frequency domain signal according to the first echo signal;
   the controller updating at least one parameter of a primary classifier according to the first frequency domain signal and a training target corresponding to the first frequency domain signal;
   the controller generating a second frequency domain signal according to the second echo signal; and
   the controller computing an energy sum of positive velocities and an energy sum of negative velocities for second spectrogram data in the second frequency domain signal;
   the controller determining which of the energy sums is larger;
   the controller generating second combined spectrogram data according to at least energies of velocities having a larger energy sum;
   the controller transforming second data corresponding to M second velocities in the second combined spectrogram data into M sets of second spectrum data;
   the controller combining the M sets of second spectrum data to acquire second cadence spectrum data;
   the controller acquiring a second cadence feature from the second cadence spectrum data; and
   the controller generating object classification data corresponding to the second frequency domain signal according to the second cadence feature and the at least one parameter of the primary classifier, wherein the object classification data is associated with presence of a second object.

2. The object recognition method of claim 1, further comprising:
   the controller updating the at least one parameter of the primary classifier according to the second frequency domain signal and the object classification data.

3. The object recognition method of claim 1, wherein the first frequency domain signal is a first Doppler frequency domain signal, the second frequency domain signal is a second Doppler frequency domain signal, the first echo signal has a first Doppler frequency shift relative to a first detection signal and corresponding to a movement of a first object, the second echo signal has a second Doppler frequency shift relative to a second detection signal and corresponding to a movement of the second object, the training target is associated with a motion type of the first object, and the object classification data is associated with a motion type of the second object.

4. The object recognition method of claim 1, further comprising:
   the antenna transmitting a first detection signal in a time domain, wherein the first echo signal is generated in response to the first detection signal upon presence of a first object;
   the antenna transmitting a second detection signal in the time domain, wherein the second echo signal is generated in response to the second detection signal upon presence of the second object; and
   wherein the controller generating the first frequency domain signal according to the first echo signal comprises:
      the controller performing a time-domain-to-frequency-domain transform on the first echo signal to generate the first frequency domain signal; and
   the controller generating the second frequency domain signal according to the second echo signal comprises:
      the controller performing a time-domain-to-frequency-domain transform on the second echo signal to generate the second frequency domain signal.

5. The object recognition method of claim 1, wherein the primary classifier comprises an artificial neural network.

6. The object recognition method of claim 1, further comprising:
   the controller determining presence of a first object according to the first echo signal; and
   an auxiliary classifier inputting the training target corresponding to the first frequency domain signal according to the presence of the first object.

7. The object recognition method of claim 1, further comprising:
   the antenna receiving the first echo signal during a first interval;
   an auxiliary sensor receiving an auxiliary signal during a second interval; and
   an auxiliary classifier generating the training target corresponding to the first frequency domain signal according to the auxiliary signal;
   wherein the first interval and the second interval are at least partially overlapping.

8. The object recognition method of claim 7, wherein the first echo signal is associated with presence of a first object, the auxiliary signal is associated with the presence of the first object, and the presence of the first object occurs during an at least partially overlapping interval.

9. The object recognition method of claim 7, wherein the auxiliary classifier generating the training target corresponding to the first frequency domain signal according to the auxiliary signal comprises:
   the auxiliary classifier generating the training target corresponding to the first frequency domain signal by using the auxiliary signal and an auxiliary classifier, wherein the training target is associated with the presence of the first object.

10. The object recognition method of claim 7, wherein the auxiliary signal comprises a video data stream or an audio data stream.

11. The object recognition method of claim 1, wherein the training target and the object classification data respectively comprise an object type or a motion type.

12. The object recognition method of claim 1, wherein:
the controller updating the at least one parameter of the primary classifier according to the first frequency domain signal and the training target corresponding to the first frequency domain signal comprises:
the controller transforming first data corresponding to M first velocities and in the first frequency domain signal into M sets of first spectrum data, wherein M is a positive integer exceeding 1;
the controller combining the M sets of first spectrum data to acquire first cadence spectrum data;
the controller acquiring a first cadence feature from the first cadence spectrum data; and
the controller updating the at least one parameter of the primary classifier according to the first cadence feature and the training target corresponding to the first frequency domain signal.

13. The object recognition method of claim 12, wherein the second object comprises a primary portion and a secondary portion, and the controller acquiring the second cadence feature from the second cadence spectrum data comprises:
the controller identifying, from the second cadence spectrum data, a fundamental frequency and a primary velocity of the primary portion;
the controller generating a movement distance according to the fundamental frequency and the primary velocity;
the controller identifying, from the second cadence spectrum data, a secondary portion energy corresponding to the secondary portion and a primary portion energy corresponding to the primary portion;
the controller generating a ratio of the secondary portion energy to the primary portion energy; and
the controller employing the movement distance and the ratio as the second cadence feature.

14. The object recognition method of claim 12, wherein the controller acquiring the second cadence feature from the second cadence spectrum data comprises:
the controller identifying, from the second cadence spectrum data, a fundamental frequency and a harmonic frequency to serve as the second cadence feature.

15. The object recognition method of claim 12, wherein the controller acquiring the second cadence feature from the second cadence spectrum data comprises:
the controller performing an autocorrelation process on the second cadence spectrum data to generate a plurality of autocorrelation values; and
the controller computing a minimum difference of a plurality difference between two adjacent ones of the plurality of autocorrelation values to employ the minimum difference as the second cadence feature.

16. The object recognition method of claim 12, further comprising the controller performing a velocity normalization process on the second spectrogram data according to a maximum velocity of the second spectrogram data to generate second velocity-normalized spectrogram data;
wherein the controller transforming the second data corresponding to the M second velocities and in the second frequency domain signal into the M sets of second spectrum data comprises:
the controller transforming the second data corresponding to the M second velocities and in the second velocity-normalized spectrogram data into M sets of second spectrum data, respectively.

17. The object recognition method of claim 1, wherein the controller generating the second combined spectrogram data according to at least the energies of velocities having the larger energy sum comprises:
dividing energies of velocities having a larger energy sum to energies of corresponding velocities having a smaller energy sum, respectively, to generate the second combined spectrum data.

18. The object recognition method of claim 1, wherein the controller generating the second combined spectrogram data according to at least the energies of velocities having the larger energy sum comprises:
generating the second combined spectrogram data according to velocities having a larger energy sum.

19. An object identification system comprising:
an antenna configured to transmit a first detection signal and receive a first echo signal upon detecting a first object; and
a controller coupled to the antenna and configured to generate a frequency domain signal according to the first echo signal, and update at least one parameter of a primary classifier according to the first frequency domain signal and a training target corresponding to the first frequency domain signal;
wherein the antenna is further configured to transmit a second detection signal and receive a second echo signal upon detecting a second object;
the controller is further configured to generate a second frequency domain signal according to the second echo signal, compute an energy sum of positive velocities and an energy sum of negative velocities for second spectrogram data in the second frequency domain signal, determine which of the energy sums is larger, generate second combined spectrogram data according to velocities having a larger energy sum, transform second data corresponding to M second velocities in the second combined spectrogram data into M sets of second spectrum data, combine the M sets of second spectrum data to acquire second cadence spectrum data, acquire a second cadence feature from the second cadence spectrum data, and generate object classification data corresponding to the second frequency domain signal according to the second cadence feature and the at least one parameter of the primary classifier; and
the object classification data is associated with presence of a second object.

\* \* \* \* \*